(12) United States Patent
Yamaguchi et al.

(10) Patent No.: US 10,233,110 B2
(45) Date of Patent: Mar. 19, 2019

(54) MATERIAL SET FOR MANUFACTURING GLASS OBJECT, LIQUID MATERIAL FOR MANUFACTURING GLASS OBJECT, METHOD OF MANUFACTURING GLASS OBJECT, GLASS OBJECT, AND DEVICE FOR MANUFACTURING GLASS OBJECT

(71) Applicants: Takeo Yamaguchi, Kanagawa (JP); Hitoshi Iwatsuki, Shizuoka (JP); Kazumi Ohtaki, Shizuoka (JP); Takuya Saito, Kanagawa (JP); Teruki Kusahara, Shizuoka (JP)

(72) Inventors: Takeo Yamaguchi, Kanagawa (JP); Hitoshi Iwatsuki, Shizuoka (JP); Kazumi Ohtaki, Shizuoka (JP); Takuya Saito, Kanagawa (JP); Teruki Kusahara, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 310 days.

(21) Appl. No.: 15/177,912

(22) Filed: Jun. 9, 2016

(65) Prior Publication Data
US 2016/0368806 A1   Dec. 22, 2016

(30) Foreign Application Priority Data

Jun. 22, 2015 (JP) .................................. 2015-124874
May 2, 2016 (JP) .................................. 2016-092493

(51) Int. Cl.
*B33Y 10/00*        (2015.01)
*B33Y 30/00*        (2015.01)
(Continued)

(52) U.S. Cl.
CPC .............. *C03B 19/06* (2013.01); *B22F 3/008* (2013.01); *B29C 64/165* (2017.08); *B33Y 70/00* (2014.12);
(Continued)

(58) Field of Classification Search
None
See application file for complete search history.

(56) References Cited

U.S. PATENT DOCUMENTS 8,425,816 B2 *  4/2013  Okamoto ................ C08L 83/04
                                                  264/109
2004/0094058 A1  5/2004  Kasperchik et al.
(Continued)

FOREIGN PATENT DOCUMENTS

EP      3 070 136 A1     9/2016
JP      2007-502713      2/2007
(Continued)

OTHER PUBLICATIONS

Extended European Search Report dated Nov. 25, 2016 in Patent Application No. 16173956.0.
(Continued)

*Primary Examiner* — Mary Lynn F Theisen
(74) *Attorney, Agent, or Firm* — Oblon, McClelland, Maier & Neustadt, L.L.P.

(57) ABSTRACT

A material set for manufacturing a glass object includes a powder material including glass and a first water soluble resin; and a liquid material including water and a second water soluble resin having a mass average molecular weight of less than 50,000.

13 Claims, 2 Drawing Sheets

(51) Int. Cl.
    *B33Y 70/00*     (2015.01)
    *B33Y 80/00*     (2015.01)
    *C03B 19/06*     (2006.01)
    *B29C 64/165*     (2017.01)
    *C03C 17/32*     (2006.01)
    *C08L 29/04*     (2006.01)
    *C08L 39/06*     (2006.01)
    *C09D 139/06*     (2006.01)
    *B22F 3/00*     (2006.01)
    *C03C 3/085*     (2006.01)

(52) U.S. Cl.
    CPC ............. *C03C 3/085* (2013.01); *C03C 17/32* (2013.01); *C08L 29/04* (2013.01); *C08L 39/06* (2013.01); *C09D 139/06* (2013.01); *B33Y 10/00* (2014.12); *B33Y 30/00* (2014.12); *B33Y 80/00* (2014.12)

(56) References Cited

U.S. PATENT DOCUMENTS

| | | | | |
|---|---|---|---|---|
| 2005/0080191 | A1* | 4/2005 | Kramer | C08F 8/00 525/191 |
| 2006/0251535 | A1* | 11/2006 | Pfeifer | B22F 3/1055 419/36 |
| 2015/0306822 | A1* | 10/2015 | Hirata | B33Y 70/00 428/327 |
| 2015/0375459 | A1* | 12/2015 | Sato | B29C 67/0081 428/446 |
| 2016/0040025 | A1* | 2/2016 | Norikane | C09D 103/02 106/157.2 |
| 2016/0236412 | A1 | 8/2016 | Kusahara et al. | |
| 2016/0271695 | A1* | 9/2016 | Osaka | B22F 3/1055 |
| 2016/0272844 | A1* | 9/2016 | Osaka | B22F 1/0062 |
| 2016/0318250 | A1* | 11/2016 | Moussa | B29C 67/0081 |
| 2016/0339602 | A1* | 11/2016 | Kato | B33Y 80/00 |
| 2018/0036945 | A1* | 2/2018 | Lereboullet | B29C 64/165 |
| 2018/0050491 | A1* | 2/2018 | Ishihara | B29C 64/165 |

FOREIGN PATENT DOCUMENTS

| | | |
|---|---|---|
| JP | 2008-201127 | 9/2008 |
| JP | 2010-188642 | 9/2010 |
| WO | WO 2004/043681 A2 | 5/2004 |
| WO | WO2004/113042 A2 | 12/2004 |
| WO | WO 2015/046629 A1 | 4/2015 |

OTHER PUBLICATIONS

U.S. Appl. No. 14/968,184, filed Dec. 14, 2015.
U.S. Appl. No. 14/938,257, filed Nov. 11, 2015.
U.S. Appl. No. 15/019,653, filed Feb. 9, 2016.
U.S. Appl. No. 15/041,761, filed Feb. 11, 2016.
U.S. Appl. No. 15/022,054, filed Mar. 15, 2016.

* cited by examiner

MATERIAL SET FOR MANUFACTURING GLASS OBJECT, LIQUID MATERIAL FOR MANUFACTURING GLASS OBJECT, METHOD OF MANUFACTURING GLASS OBJECT, GLASS OBJECT, AND DEVICE FOR MANUFACTURING GLASS OBJECT

CROSS-REFERENCE TO RELATED APPLICATIONS

This patent application is based on and claims priority pursuant to 35 U.S.C. § 119 to Japanese Patent Application Nos. 2015-124874 and 2016-092493, filed on Jun. 22, 2015 and May 2, 2016, respectively, in the Japan Patent Office, the entire disclosures of which are hereby incorporated by reference herein.

BACKGROUND

Technical Field

The present invention relates to a material set for manufacturing a glass object, a liquid material for manufacturing a glass object for curing, a method of manufacturing a glass object, a glass object, and a device for manufacturing a glass object.

Description of the Related Art

Small lot production of a complex and fine three-dimensional object is increasingly demanded. For example, powder adhesion methods are known to meet this demand.

The powder adhesion method includes, for example, supplying an adhesive material utilizing an inkjet method for a thin powder layer or laminating a powder mixture including powder particles and an adhesive particles and applying a binding agent thereto to dissolve the adhesive material particles to manufacture a three-dimensional object. In addition, a method is known which includes solidifying a powder material including a base material such as glass or ceramic covered with a hydrophobic resin by dissolving the hydrophobic resin by a hydrophobic solvent such as limonene to manufacture a three-dimensional object.

Furthermore, a method of discharging an aqueous solvent is known which includes jetting an aqueous solvent corresponding to a cross section form severed by the cross section parallel to a target object to a thin powder layer containing a powder material, a water soluble binding agent, and a fiber to activate the water soluble binding agent to be attachable to attach the powder material and the fiber mutually to manufacture a three dimensional object.

SUMMARY

According to the present invention, provided is an improved material set for manufacturing a glass object including a powder material including glass and a first water soluble resin and a liquid material including water and a second water soluble resin having a mass average molecular weight of less than 50,000.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
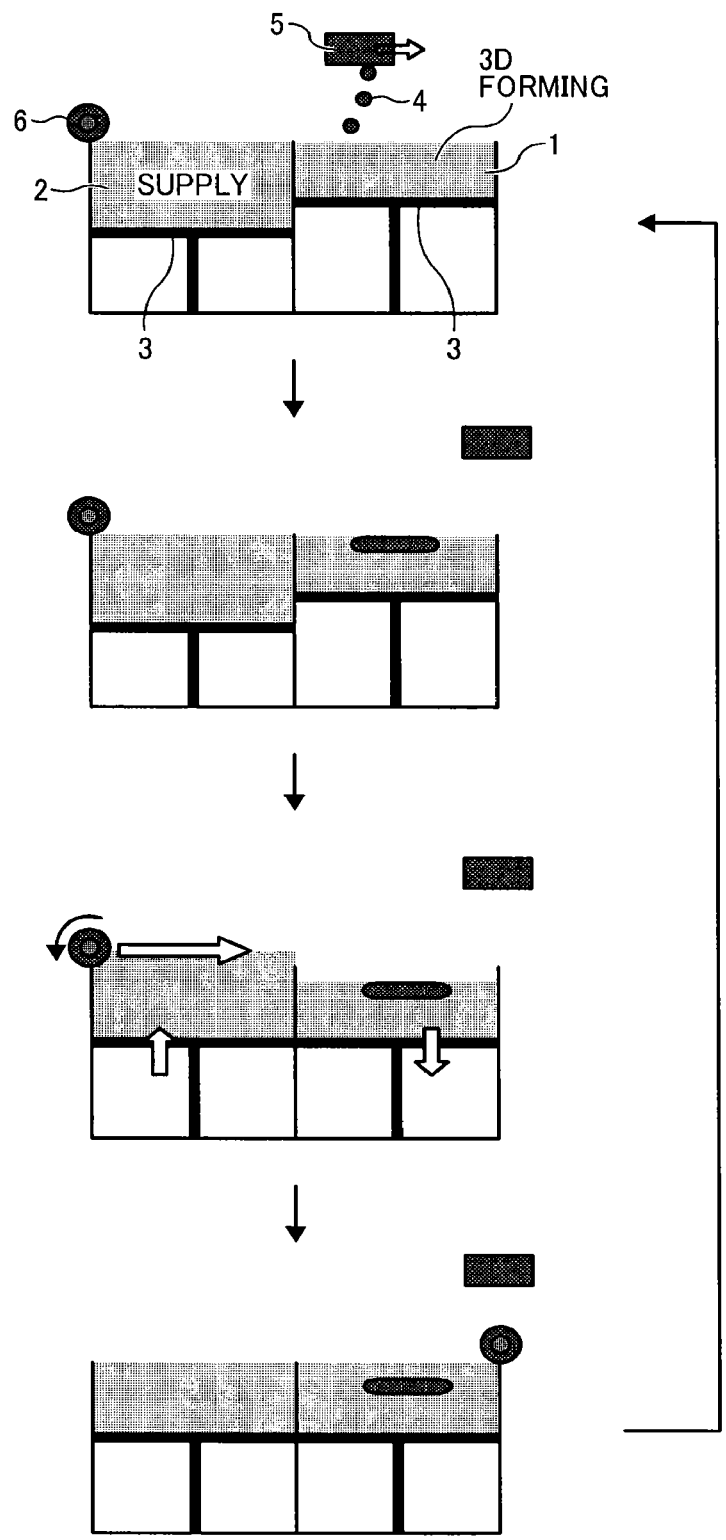
FIG. 1 is a schematic diagram illustrating an example of the device for manufacturing a glass object according to an embodiment of the present invention.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

The material set for manufacturing a glass object, the liquid material for manufacturing a glass object for curing, the method of manufacturing a glass object, the glass object, and the device for manufacturing a glass object of the present invention are described with reference to accompanying drawing. Incidentally, it is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

An embodiment of the present invention is a material set for manufacturing a glass object including a powder material including glass and a first water soluble resin and a liquid material including water and a second water soluble resin having a mass average molecular weight of less than 50,000.

The liquid material is applied to the powder material to manufacture a glass object.

Powder Material for Manufacturing Glass Object

The powder material for manufacturing a glass material for use in the present disclosure includes glass powder covered with the first water soluble resin and optionally other components.

Glass

Glass (glass powder) for use in the powder material is described next. The glass powder for use in the present invention includes ceramic, metals, etc. in addition to glass. Of these, glass having a high transparency is preferable.

Known glass materials such as soda glass and hard glass are used as the material of the glass. Of these, in calculation in percent by mass based on oxide, it is preferable to use a glass material containing $SiO_2$ in an amount of 45-75 percent, $Al_2O_3$ in an amount of 10-28 percent, ZnO in an amount of 3-13 percent, MgO in an amount of 0 to 8 percent, $TiO_2$ in an amount of 0 to 10 percent, $ZrO_2$ in an amount of 0 to 10 percent, $Cs_2O$ in an amount of 0-15 percent, and BaO in an amount of 0 - 5 percent in terms of transparency.

Transparency means that a glass sheet having a thickness of 1.0 mm has a transparency of 85 percent or more in the visible spectra (400-700 nm) area. Depending on usage, it is also preferable that such a glass sheet have a certain degree of transparency of greater than 50 percent in a near ultraviolet range, for example, 350-400 nm.

It is suitable to add a fining agent such as $AS_2O_5$ or $Sb_2O_3$ to the glass compositions mentioned above. It is also possible to add an oxide or fluoride such as $Rb_2O$, $WO_3$, CaO, SrO, $Nb_2O_5$, $AlF_3$, $B_2O_3$, $Y_2O_3$, or $P_2O_5$ and/or $Bi_2O_3$, $Ta_2O_5$, $Ga_2O_3$, PbO or $La_2O_3$.

The glass powder for use in the present invention preferably has a volume average primary particle diameter of less than 3 μm and more preferably 1.5 μm or less. When the volume average primary diameter is less than 3 μm, the forming (manufacturing) accuracy of a three-dimensional object increases as high as 10 μm or less and also demonstrates excellent transparency. When the volume average primary diameter is not greater than 3 μm, glass particles are not closely packed, which makes it difficult to improve working accuracy of an obtained glass. Transparency can be improved if fine glass powder is packed closely because voids scattering light are easily filled in the drying and sintering processes.

The volume average primary particle diameter can be measured by utilizing known methods using a known particle diameter measuring instrument such as Microtrac HRA (manufactured by NIKKISO CO., LTD.).

First Water Soluble Resin

Water soluble resins that are dissolved in the liquid material for manufacturing a glass object for curing can be the first water soluble resin. The first water soluble resin can be changed to suit to a particular application. In the present invention, "the first water soluble resin is dissolved" is that, for example, when 1 g of the first water soluble resin is mixed and stirred in 100 g of a solvent constituting the liquid material for manufacturing a glass object for curing at 30 degrees, 90 percent by mass of the first water soluble resin is dissolved.

In addition, as the first water soluble resin, 4 percent by mass (w/w percent) solution thereof at 20 degrees C. preferably has a viscosity of 40 mPa·s or less, more preferably from 1-35 mPa·s, and particularly preferably from 5-30 mPa·s.

When the viscosity is 40 mPa·s or less, the strength of the cured object (glass object) of the powder material (layer) for manufacturing a glass object formed by applying the liquid material to the powder material is improved. For this reason, problems do not arise such as losing shape during processing such as sintering or handling conducted after the layer is formed. The dimension accuracy of the cured object (3D object) of the powder material (layer) for manufacturing a glass object formed by applying the liquid material to the powder material tends to be improved.

The viscosity can be measured, for example, according to the measuring method described in JIS K7117.

In the present invention, when manufacturing a glass object, the first water soluble resin is advantageous to, for example, a water soluble prepolymer in terms of handling property and burden on environment. As the solvent for the liquid material for manufacturing a glass object for curing, an aqueous medium can be used. In addition, when the powder material is abandoned and recycled, it is easy to separate the resin portion from the glass powder component.

Specific examples of the first water soluble resin include, but are not limited to, polyvinylalcohol resins, polyacrylic acid resins, cellulose resins, starch, gelatin, vinyl resins, amide resins, imide resins, acrylic resins, and polyethylene glycol.

Homopolymers (monopolymers), heteropolymers (copolymers), and modified resins are allowed if these are water soluble. Moreover, known functional groups can be introduced thereinto and the form of a salt is also allowed.

Accordingly, for example, in the case of a polyvinyl alcohol resin, polyvinyl alcohol is suitable and modified polyvinyl alcohol (modified by an acetoacetyl group, an acetyl group, or silicone) are also suitable. In addition, butanediol vinyl alcohol copolymers are also optional. Moreover, in the case of a polyacrylic acid resin, polyacrylic acid and salts such as sodium polyacrylate are suitable. In addition, in the case of a cellulose resin, for example, cellulose is suitable and carboxymethyl cellulose (CMC) is also suitable. Moreover, in the case of an acrylic resin, polyacrylic acid and a copolymer of acrylic acid and maleic anhydride are suitable.

As the water soluble prepolymer, for example, an adhesive water soluble isocyanate prepolymer contained in a water stopping agent is suitable. Of these, modified polyvinyl alcohol is preferable.

In the present invention, of these first water soluble resins, resins having cross-linkable functional groups are preferable. There is no specific limit to such cross-linkable functional groups. These can be suitably selected to suit to a particular application. Specific examples thereof include, but are not limited to, hydroxyl group, carboxyl group, amide group, phosphoric acid group, thiol group, acetoacetyl group, and ether bond.

When the first water soluble resin has such a cross-linkable functional group, it is preferable in terms that the first water soluble resin is easily cross-linked to form a cured material (3D object).

Of these, modified polyvinyl alcohol having a cross-linkable functional group is preferable. In particular, polyvinyl alcohol modified by an acetoacetyl group is further preferable. For example, if the polyvinyl alcohol contains an acetoacetyl group, due to the working of a metal in the cross-linking agent contained in the liquid material for manufacturing a glass object for curing, the acetoacetyl group easily forms a complex three-dimensional network structure (cross-linked structure) via the metal, meaning that it has excellent cross-linking reactivity and extremely excellent bend strength.

As the polyvinyl alcohol modified by an acetoacetyl group, it is possible to use a single kind of the modified polyvinyl alcohol having different values for properties such as viscosity and saponification or two or more kinds thereof in combination. Of these, it is more preferable to use a polyvinyl alcohol modified by an acetacetyl group having an average polymerization degree of from 400-1,100.

The first water soluble resin can be used alone or in combination. In addition, it is suitable to synthesize such a resin or use products available on the market.

Specific examples of the products available on the market include, but are not limited to, polyvinyl alcohol (PVA-205C, PVA-220C, manufactured by KURARAY CO., LTD.), polyacrylic acids (JURYMER® AC-10, manufactured by TOAGOSEI CO., LTD.), sodium polyacrylate (JURYMER® AC-103P, manufactured by TOAGOSEI CO., LTD.), acetoacetyl group-modified polyvinyl alcohol (Gohsenx Z-300, Gohsenx Z-100, Gohsenx Z-200, Gohsenx Z-205, Gohsenx Z-210, and Gohsenx Z-220, manufactured by The Nippon Synthetic Chemical Industry Co., Ltd.), copolymers of carboxy group-modified polyvinyl alcohol (Gohsenx T-330, Gohsenx T-350, and Gohsenx T-330T, manufactured by The Nippon Synthetic Chemical Industry Co., Ltd.) and butanediol vinyl alcohol (Nichigo G-Polymer OKS-8041, manufactured by The Nippon Synthetic Chemical Industry Co., Ltd.), carboxymethyl cellulose (CELLOGEN 5A, manufactured by DKS Co. Ltd.), starch (Histard? PSS-5, manufactured by Sanwa Starch Co., Ltd.), and gelatin (beMatrix®, manufactured by Nitta Gelatin Inc.).

The coverage of the glass powder by the first water soluble resin preferably has an average thickness of from 5-1,000 nm, more preferably from 5-500 nm, furthermore preferably from 50-300 nm, and particularly preferably from 100-200 nm. In the present invention, when a cross-linking agent is used, it is possible to reduce the thickness of the coverage due to demonstration of curing and also strike a balance between strength and accuracy even for a thin film.

When the coverage of the glass powder has an average coverage thickness of 5 nm or greater, it is possible to improve strength of the cured object formed of the powder material (layer) for manufacturing a 3D object, which is formed by applying the liquid material to the powder material. For this reason, the obtained object is free of problems such as losing shape during handling or processing such as sintering. When the average thickness is 1,000 nm or less, the dimension accuracy of the cured object (3D object) formed of the powder material (layer) and formed by applying the liquid to the powder material for glass object is improved.

The average thickness can be obtained by, for example, embedding the powder material for manufacturing a glass object in an acrylic resin, etc., exposing the surface of the glass powder by etching, etc., and thereafter measuring the thickness with a scanning tunneling microscope (STM), an atomic force microscope (AFM), a scanning electron microscope (SEM), etc.

The coverage factor (area ratio) of the surface of the glass powder covered with the first water soluble resin has no particular limit and can be suitably selected to suit to a particular application. For example, it is preferably 15 percent or more, more preferably 50 percent or more, and particularly preferably 80 percent or more.

When the coverage factor is 15 percent or more, the strength of the cured object (3D object) of the powder material (layer) for manufacturing a glass object formed by providing the liquid material for manufacturing a glass object for curing to the powder material is improved, which makes it free of problems such as losing shape during processing such as sintering or handling conducted after forming the layer. The dimension accuracy of the cured object (3D object) of the powder material (layer) for manufacturing a glass object formed by applying the liquid material for manufacturing a glass object for curing to the powder material is improved.

It is also possible to obtain the coverage factor by, for example, observing a photograph of a powder material for manufacturing a glass object and calculating the average of the area ratio (percent) of the portion covered with the first water soluble resin to all the area of the surface of the glass powder photo-shot in the two-dimensional photograph. This average is determined as the coverage factor.

In addition, it is also possible to measure the coverage factor by element-mapping according to energy dispersion type X-ray spectrocscopy such as SEM-EDS for the portion covered with the first water soluble resin.

The glass powder is also used as granulated powder as a secondary particle after the glass powder is covered with the first water soluble resin. In this case, the number of the contact points between particles decreases so that fluidity is improved as powder. For this reason, a uniform powder layer can be formed. The average secondary particle diameter is preferably 1-1,000 μm and more preferably 1.5-100 μm.

Other Components

In addition to the above-mentioned, for example, a fluidity improver, a filler, a leveling agent, and a sintering helping agent can be added to the glass powder. Inclusion of a fluidity improver is preferable to easily and effectively form a layer of the powder material for manufacturing a glass object, etc. It is preferable to contain a filler because voids etc. do not easily appear in an obtained cured object (3D object). Addition of a leveling agent to the powder material for manufacturing a glass object is preferable because the wettability thereof is improved, so that handling becomes easy. Addition of a sintering helping agent to the powder material for manufacturing a glass object is preferable because sintering at lower temperatures is made possible during sintering treatment for an obtained three-dimensional object.

Also, an aqueous medium capable of dissolving the first water soluble resin can be used. As the aqueous medium, for example, a hydrophilic organic solvent can be used.

Manufacturing of Powder Material for Manufacturing Glass Object

The method of manufacturing the powder material for manufacturing a glass object has no particular limit and can be suitably selected to suit to a particular application. For example, the glass powder can be covered with the first water soluble resin to obtain the powder material according to a known covering method.

There is no specific limitation to the method of covering the surface of the glass powder with the first water soluble resin. A known method is utilized to cover the glass powder. For example, a tumbling fluidizing coating method, a spray drying method, a stirring mixing addition method, a tipping method, a kneader coating method, etc. are suitable. In addition, these coverage methods can be conducted by known various types of coating devices and granulating devices available on the market.

Properties of Powder Material for Manufacturing Glass Object

The powder material for manufacturing a glass object for use in the present invention preferably has a volume average primary particle diameter of less than 3 μm and more preferably 1.5 μm or less. When the volume average primary particle diameter is not less than 3 μm, an intermediate obtained before sintering is extremely brittle, so that handling property and dimension accuracy are easily degraded. Furthermore, after sintering, a resultant glass object tends to contain many bubbles. For this reason, the hardness of the glass object easily lowers and the transparency thereof tends to deteriorates.

The particle size distribution of the powder material for manufacturing a glass object is not particularly limited and can be suitably determined to suit to a particular application.

Moreover, as the property of the powder material for manufacturing a glass object, the repose angle thereof is preferably 60 degrees or less, more preferably 50 degrees or less, and furthermore preferably 40 degrees or less. When the repose angle is 60 degrees or less, it is possible to stably and efficiently place the powder material for manufacturing a glass object on a desired position on a substrate.

The repose angle can be measured by, for example, powder property measuring device (powder tester PT-N type, manufactured by Hosokawa Micron Corporation.

The powder material for manufacturing a glass object of the present invention can be applied to simple and efficient manufacturing of various modeled (formed) objects and structures and also particularly suitably applied to the material set for manufacturing a glass object, a liquid material for manufacturing a glass object for curing, a method of manufacturing a glass object, a glass object manufactured by the method, and a device for manufacturing a glass object.

By simply applying the liquid material for manufacturing a glass object for curing to the powder material for manufacturing a glass object of the present invention, a structure having a complex three-dimensional object can be easily and efficiently manufactured with a good dimension accuracy. For this reason, a complex and accurate glass object, which used to be made by only an experienced special glass blower, can be easily manufactured.

The thus-obtained structure is a cured material (3D object) having a sufficient hardness so that the structure is free of losing shape even when it is held by a hand or placed in or out of a mold or extra powder material for manufacturing a glass object is removed by an air blow processing. That is, excellent handling property is obtained. The cured material can be used as is. Also, it is possible to sinter the cured material to manufacture a three-dimensional object as a sintered compact of the three-dimensional object. Furthermore, the object obtained after the sintering is free of unwanted voids, so that the object having an aesthetic appearance is easily obtained. Also, dying the object is arbitrarily possible, which provides freedom of design.

As a glass object, high transparency is demanded. To achieve this property, particles are unified by sintering to dwindle voids in an object almost to nothing. However, if an object is manufactured from powder, voids tend to easily appear in comparison with a method of manufacturing an object in a furnace. Light scatters at such a surface having voids, which leads to a problem that feeling of transparency of the object is diminished.

To the contrary, the present inventors made an investigation about design factors relating to glass objects and have found that using a sintering helping agent as an additive is most effective to improve transparency.

The properties required as a sintering helping agent are:
Melted at relatively low temperatures
Smaller than the average secondary particle diameter of glass powder
Not easily reactive with glass (at high temperatures)
Not easily color glass
Not to prevent adhesion of glass particles (before sintering) etc. The sintering helping agent accelerates melting at lower temperatures and secures time for melted particles to be unified, and prevents voids from appearing in an object, thereby increasing the density thereof so that transparency of the object is improved.

Such sintering helping agents for glass demonstrating such effects include at least one kind of inorganic compound such as aluminum nitride, glass flit, and silica nano particles. These can be used alone or in combination.

How to use a sintering helping agent is, for example, a method of covering the glass with the first water soluble resin and thereafter adding the sintering helping agent thereto or a method of dispersing the sintering helping agent in the liquid material for manufacturing a glass object. This is deferred in detail.

Liquid Material for Manufacturing Glass Object

The liquid material for manufacturing glass object for curing of the present invention includes water and a second water soluble resin having a mass average molecular weight of less than 50,000. In addition, the liquid material optionally contains a cross-linking agent to cross-link with the first water soluble resin, a medium (solvent) to dissolve the first water soluble resin, and a component to accelerate such dissolution. Moreover, it may further optionally contain a coloring component to color the glass, a stabilizer to maintain storage stability of the liquid material, a surfactant, and other components.

The liquid material for manufacturing a glass object of the present invention preferably has a viscosity of 20 mPa·s or less and more preferably 3-20 mPa·s at 25 degrees C. When the viscosity at 25 degrees C. is 20 mPa·s or less, the liquid material is sufficiently stably discharged and applied in an inkjet method. In addition, it is preferable that the viscosity change rate of the liquid material be less than 20 percent between before and after the liquid is left undone at 50 degrees C. for three days. When the viscosity change rate is 20 percent or greater, the liquid material may not be sufficiently stably discharged or applied in an inkjet method.

Second Water Soluble Resin

When the second water soluble resin is added to prepare the liquid material for manufacturing a glass object, the second water soluble resin preferably has a feature to adjust the viscosity of the liquid material. Also, it is preferable that the second water soluble resin can be dissolved in a medium (which is described in detail later), do not interfere the effects of a cross-linking agent and other additives, and adjust the thickness to a degree that an inkjet printer head can discharge the liquid material. Generally, water soluble resins satisfy such conditions. However, it is confirmed that typical water soluble resins can adjust viscosity immediately after the liquid material is prepared but the viscosity changes over time.

The present inventors investigated whether polyvinyl alcohol, which is specified as one of the first water soluble resin to cover the glass, can be used as the second water soluble resin. Polyvinyl alcohol used had no functional group demonstrating cross linking reaction. The viscosity change rate of the liquid material tended to be suppressed. However, when this liquid material was used to manufacture an object, objects including many bubbles therein were manufactured and the color tended to be clouded. As a result of investigating viscosity adjusting agents usable instead of polyvinyl alcohol, polyvinyl pyrrolidone was confirmed to be suitable in terms of the feature described above and the obtained object was able to be subject to processing while it had transparency.

Although it is not possible to jump to any conclusion, considering that both are originally water soluble resins having high affinity with each other, if the same material is used in preparation, affinity is further improved. Therefore, when the liquid material for curing is brought into contact with the powder material, the resin particles are deduced to be immediately aggregated and unified. As a result of the aggregation and unification, the liquid material excessively quickly permeates into the powder layer so that voids present since powder recoating are not filled, remaining as bubbles.

Accordingly, in the present invention, the first water soluble resin and the second water soluble resin are preferably different from each other. By changing the kinds of the water soluble resins intentionally, the liquid material having optimal permeability is provided which can create time to dissolve the first water soluble resin in the powder layer and fill voids therein, thereby improving transparency of a glass object.

The second water soluble resin has a mass average molecular weight of less than 50,000 and preferably 5,000–<50,000. When the mass average molecular weight is not less than 50,000, for example, although the addition amount is adjusted and the thickness is sufficient for an inkjet head to discharge, the liquid material is not stably discharged by the inkjet head so that the nozzle easily clogs due to drying. In addition, remnants of the second water soluble resin remain in a glass object as impurities even after the object is sintered and significantly deforms and blackens the object. As a consequence, transparency is degraded so that the quality of the obtained glass object is significantly inferior.

The mass average molecular weight in the present disclosure can be measured by utilizing a known method. However, the mass average molecular weight may fluctuate in an extremely wide rage depending on the measuring conditions. For example, when the molecular weight of polyvinyl pyrrolidone is measured by utilizing gel permeation chromatography (GPC) using a typical solvent, dimethylformamide, the obtained molecular weight is extremely small.

This is because since polyvinyl pyrrolidone and the GPC column have extremely high affinity, when a solvent which does not dissolve polyvinyl pyrrolidone well is used, polyvinyl pyrrolidone having a large molecular weight cannot be extracted from the column so that the detected molecular weight relatively becomes low. When measuring the mass average molecular weight, it is desirable to adopt a solvent having good affinity with the second water soluble resin, for example, N-methylpyrrolidone (NMP) in the case of polyvinyl pyrrolidone. The measuring conditions adopted in Examples are ad follows:

Measuring Molecular Weight of Polyvinyl Pyrrolidone (PVP)

Measuring sample: PVPK-15, K-30, K-60, and K-85 (manufactured by TOKYO CHEMICAL INDUSTRY CO., LTD.)

HPLC system (GPC system), manufactured by JASCO Corporation

Analysis column: Shodex GPC KD-806M×two (Nos. C2370131 and C2370139)

Column temperature: 40 degrees C.

Transfer phase (eluent): NMP (for HPCL, manufactured by Sigma-Aldrich)

Detector: Differential refractometer (manufactured by JASCO Corporation)

Calibration condition: three-dimensional approximation curve using standard polystyrene (SM-105, Shodex®, manufactured by SHOWA DENKO K.K.)

Calibration curve range: 1200-278,000 (obtained value is in polystyrene conversion)

Furthermore, when the second water soluble resin having a mass average molecular weight of 100,000 or greater is used, the resin is thickened after stored for a long period of time to a degree that an inkjet head cannot discharge the liquid. This causes clogging and the resin tends to remain in an object after sintering. As a result, the obtained object is significantly deformed and blackened, resulting in degradation of transparency. Consequently, the quality of the obtained glass object significantly becomes inferior.

In addition, when polyvinyl pyrrolidone is used as the second water soluble resin, polyvinyl pyrrolidone is preferable because it has not only thickening effect but also a feature of dispersant to disperse a pigment. This is because polyvinyl pyrrolidone demonstrates excellent attachment force and dispersion ability to an inorganic material. In particular when an object is manufactured by using a coloring material such as an inorganic pigment having a relatively large specific weight, dispersability of polyvinyl pyrrolidone is significantly suitable to keep the form of an object and demonstrate uniform coloring property.

The proportion of the second water soluble resin in the liquid material for manufacturing a glass object for curing is preferably less than 5 percent by mass.

When the proportion of the second water soluble resin is 5 percent by mass or greater, the storage stability of the liquid material tends to deteriorate and the second water soluble resin easily remains in an object after sintering and is blackened, resulting in degradation of transparency. The proportion of the second water soluble resin in the liquid material for curing is preferably not less than 0.01 percent by mass.

The thickness of the liquid material for curing of the present invention is preferably 20 mPa·s or less.at 25 degrees C. If the thickness is outside this range, an inkjet head cannot discharge the liquid material and a glass object contains many bubbles therein, thereby extremely degrading transparency as glass, resulting in deterioration of quality. In addition, the strength of the object is also worsened.

Specific examples of the second water soluble resin other than polyvinyl pyrrolidone include, but are not limited to, polyacrylic acid resins, cellulose resins, starch, gelatin, vinyl resins, amide resins, imide resins, acrylic resins, and polyethylene glycol.

Coloring Component

The liquid material for manufacturing a glass object for curing may optionally contain a coloring material. Known coloring materials can be used as the coloring material for use in the present invention. It is suitable to use a stable coloring material demonstrating coloring even after an object is sintered. Normally, inorganic pigments having durability at high temperatures are generally used.

The inorganic pigment includes natural inorganic pigments and synthesized inorganic pigments. Also, it can be used as a pigment mixture containing two or more kinds of pigments irrespective of natural or synthetic pigments. Specific examples of the inorganic pigment include, but are not limited to, glass color LES series and LN series for property, manufactured by OKUNO CHEMICAL INDUSTRIES CO., LTD. and pigments for pottery, manufactured by NITTO GANRYO KOGYO CO., LTD.

The proportion of the coloring material can be changed and, for example, is preferably 0.01-10.0 percent by mass to the liquid material for curing.

According to the present invention, coloring property is obtained by using a coloring material and a glass object having a wide range of freedom of design is provided.

Sintering Helping Agent

It is preferable that the liquid material of the present invention contains a coloring material. The agent mentioned above can be used as the sintering helping agent for use in the present disclosure. Dispersion, etc. of a sintering helping agent in the liquid material for manufacturing a glass object for curing is described later.

Medium

The medium is not particularly limited and can be changed suitably to suit to a particular application. Specific examples thereof include, but are not limited to, water, alcohols such as ethanol, hydrophilic media such as ether and ketones, aliphatic hydrocarbons, ether-based solvents such as glycol ether, ester-based solvents such as ethylacetate, ketone-based solvents such as methylethyl ketone, and higher alcohols. Of these, considering burden on environment and discharging stability (less viscosity change over time) when applying the liquid material by an inkjet method, an aqueous medium is preferable and water is more preferable to reduce the burden on environment. As the aqueous medium, water may contain a small quantity of components such as the alcohol mentioned above. However, if the medium of the liquid material is an aqueous medium, the main component of the first water soluble resin is preferably a water soluble organic material.

The hydrophilic media includes, for example, water, alcohols such as ethanol, ethers, and ketones. A hydrophilic organic solvent containing a component such as the alcohol mentioned above other than water can be the aqueous medium.

Hydrophilic Organic Solvent

Of the media, hydrophilic organic solvents are preferable. There is no specific limit to the hydrophilic organic solvent. Preferred specific examples thereof are as follows 1,2,6-hexane triol, 1,2-butane diol, 1,2-hexanediol, 1,2-pentanediol, 1,3-diemthyl-2-imidazolidinone, 1,3-butane diol, 1,3-propane diol, 1,4-butane diol, 1,5-pentanediol, 1,6-hexanediol, 2,2-dimethyl-1,3-propane diol, 2,3-butane diol, 2,4-pentanediol, 2,5-hexanediol, 2-ethyl-1,3-hexanediol, 2-pyrolidone, 2-methyl-1,3-propane diol, 2-methyl-2,4-pentanediol, 3-methyl-1,3-butane diol, 3-methyl-1,3-hexanediol, N-methyl-2-pyrolidone, N-methyl pyrrolidinone, β-buthoxy-N,N-dimethylpropione amide, β-methoxy-N,N-dimethyl propione amide, γ-butylolactone, ε-caprolactam, ethylene glycol, ethylene glycol-n-butyl ether, ethylene glycol-n-propylether, ethylene glycol phenyl ether, ethylene glycol mono-2-ethylhexyl ether, ethylene glycol monoethyl ether, glycerin, diethylene glycol, diethylene glycol-n-hexylether, diethylene glycolmethylether, diethylene glycol monoethyl ether, dietheylene glycol monobutyl ether, diethylene glycol monomethyl ether, diglycerin, dipropylene glycol, dipropylene glycol, dipropylene glycol-n-propylether, dipropylene glycol monomethylether, dimethylsulfoxide, sulfolane, thiodiglycol, tetraethylene glycol, triethylene glycol, triethylene glycol ethylether, triethylene glycol dimethylether, triethylene glycol monobutylether, triethylene glycol methylether, tripropylene glycol, tripropylene glycol-n-propylether, tripropylene glycol methylether, trimethylol ethane, tirmethylol propane, propylpropylene diglycol, propylene glycol, propylene glycol-n-butylether, propylene glycol-t-butylether, propyleneglycol phenylether, propylene glycol monoethylether, hexylene glycol, polyethylene glycol, and polypropylene glycol.

The hydrophilic organic solvent is preferably less than 20 percent by mass to the liquid material for curing. If the proportion is less than 20 percent by mass, strength of the glass object can be improved. To suppress drying of an inkjet nozzle, the proportion is preferably 1.0 percent by mass.

Cross-linking Agent

If the first water soluble resin has a cross-linkable functional group, the liquid material preferably has a cross-linking agent. Due to this, strength of the glass object can be improved. Since the first water soluble resin is dissolved by the liquid material for manufacturing a glass object for curing and also cross-linkable, if the liquid material is applied to the first water soluble resin, the first water soluble resin is dissolved and cross-linked due to the cross-linking agent. As a result, when a thin layer is formed by using the powder material and the liquid material is applied to the thin layer, the think layer is cured.

"Cross-linking agent" in the present disclosure is a compound having a portion cross-linkable with a functional group of a target (organic material such as polymer) of cross-linking and constitutes the bond portion of the cross-linking bond between the targets of cross-linking.

Therefore, "cross-linking agent" is clearly distinguished from so-called "initiator" like peroxides (organic peroxides) and reducing agents, which is self-decomposed upon application of heat or light, produces free radicals, which are added to unsaturated monomers to open double-bonds, and conducts next radical reaction. The initiator repeats this process to promote polymerization, and extracts a hydrogen bound to a carbon in a saturated compound to produce other radicals for re-bond to form cross-linking between the saturated compounds. That is, the initiator itself is not part of the constituents of the cross-linked portion but just initiates and promotes radical reaction.

There is no specific limitation to the cross-linking agent and any known cross-linking agent can be suitably selected to suit to a particular application. For example, metal salts, metal complexes, organic zirconium-based compounds, organic titanate-based compounds, and chelates are suitable.

Specific examples of the organic zirconium-based compound include, but are not limited to, zirconium oxychloride, ammonium zirconium carbonate, and ammonium zirconium lactate.

Specific examples of the organic titanium-based compounds include, but are not limited to, titanium acylate and titanium alkoxide.

These can be used alone or in combination. Of these, metal salts are more preferable.

As the metal salt, for example, cationic divalent or higher valent ion metals dissociated in water are suitable.

Specific examples thereof include, but are not limited to, zirconium oxychloride octahydrate (quadrivalent), aluminum hydroxide (trivalent), magnesium hydroxide (divalent), titanium lactate ammonium salt (quadrivalent), aluminum subacetate (trivalent), ammonium salt of zirconium carbonate (quadrivalent), and titanium triethanol aminate (quadrivalent).

In addition, these are available on the market. Specific examples of such products include, but are not limited to, zirconium oxychloride octahydrate (acid zirconium chloride, manufactured by DAIICHI KIGENSO KAGAKU KOGYO Co., LTD.), aluminum hydroxide (manufactured by Wako Pure Chemical Industries, Ltd.), magnesium hydroxide (manufactured by Wako Pure Chemical Industries, Ltd.), titanium lactate ammonium salts (Orgatix TC-300, manufactured by Matsumoto Fine Chemical Co. Ltd.), zirconium lactate ammonium salts (Orgatix ZC 300, manufactured by Matsumoto Fine Chemical Co. Ltd.), basic aluminum lactate (manufactured by Wako Pure Chemical Industries, Ltd.), bisvinyl sulfone compound (VS-B (K-FJ-C), manufactured by FUJIFINE Chemical CORPORATION), carboxylic acid zirconium oxide ammonium salt (Zircosol AC-20, manufactured by DAIICHI KIGENSO KAGAKU KOGYO CO., LTD.), and titanium triethanol aminate (Orgatix TC-400, manufactured by Matsumoto Fine Chemical Co. Ltd.). Of these, to obtain a glass object having excellent strength, ammonium zirconium carbonate is particularly preferable.

Stabilizer

As the stabilizer, any article capable of suppressing viscosity change of the liquid material for curing and maintaining storage stability is suitable. The stabilizer can be selected to suit to a particular application. Examples thereof are polyols having an amino group, chelating agents having an amino group, chelating agents having a phosphono group, gluconic acid, and salts thereof.

Specific examples of the polyols having an amino group include, but are not limited to, 2-amino-2-methyl-1,3-propane diol (AMPD), 2-amino-2-ethyl-1,3-propane diol (AEPD), and 2-(dimethylamino)-2-hydroxymethyl-1,3-propane diol (AHMPD). Of these, 2-amino-2-methyl-1,3-propane diol (AMPD) and 2-amino-2-ethyl-1,3-propane diol (AEPD) are preferable.

Specific example of the chelating agent having an amino group include, but are not limited to, dihydroxyethyl glycin (DHEG) and salts thereof.

Specific examples of the chelating agent having a phosphono group include, but are not limited to, aminotrimethylene phosphonic acid (NTMP) or salts thereof, phosphonobutane tricarboxylic acid (PBTC) and salts thereof, and hydroxyethane diphosphonic acid and salts thereof.

The stabilizer accounts for 0.1-5 percent by mass of the liquid material. When the proportion of the stabilizer is less than 0.1 percent by mass, storage stability of the liquid material may deteriorate. In addition, when the stabilizer accounts for greater than 5 percent by mass, the cross-linking power of a cross-linking agent tends to deteriorate.

Surfactant

In addition, in the present invention, surfactants are used to adjust the surface tension of the liquid material.

As the surfactant, for example, anionic surfactants, non-ionic surfactants, or amphoteric surfactants are used. Such a surfactant is selected not to degrade dispersion stability due to the combination with a wetting agent and a water soluble organic solvent.

Specific examples of the anionic surfactants include, but are not limited to, polyoxyethylene alkylether acetates, dodecyl benzene sulfonates, succinic acid ester sulfonates, laurates, and polyoxyethylene alkylether sulfates.

Specific examples of the nonionic surfactants include, but are not limited to, polyoxyethylene alkylether, polyoxyethylene polyoxypropylene alkylethers, polyoxyethylene alkylesters, polyoxyethylene polyoxypropylene alkylesters, polyoxyethylene sorbitan aliphatic acid esters, polyoxyethylene alkylphenyl ethers, polyoxyethylene alkylamines, and polyoxyethylene alkylamides.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples thereof include, but are not limited to the following. For example, lauryldimethyl amineoxide, myristyl dimethyl amineoxide, stearyldimethyl amineoxide, dihydroethyl lauryl amineoxide, polyoxyethylene palm oil alkyldimethyl amineoxide, dimethylalkyl (palm) betaine, and dimethyl laurylbetaine.

Such surfactants are easily available from surfactant manufactures such as Nikko Chemicals Co., Ltd., NIHON EMULSION Co., Ltd., Nippon Shokubai Co., Ltd., TOHO Chemical Industry Co., Ltd., Kao Corporation, ADEKA CORPORATION, Lion Corporation, AOKI OIL INDUSTRIAL CO., LTD., and Sanyo Chemical Industries, Ltd.

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Of these, SURFYNOL® 104, 465, and TG are particularly good to demonstrate good printing quality.

Specific examples of the fluoro-surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide compounds, polyoxyalkylene ether polymers having a perfluoro alkyl ether group at its side chain and sulfuric acid ester salts thereof, and fluorine-containing aliphatic polymer esters.

Specific examples of the products as fluoro-surfactants available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, FC-431, and FC-4430 (all manufactured by SUMITOMO 3M); FT-110, FT-250, FT-251, and FT-400S (manufactured by NEOS COMPANY LIMITED); ZONYL FS-62, ZONYL FSA, ZONYL FSE, ZONYL FSJ, ZONYL FSP, ZONYL TBS, ZONYL UR, ZONYL FSO, ZONYL FSO-100, ZONYL FSN N, ZONYL FSN-100, ZONYL FS-300, and ZONYL FSK (all manufactured by E. I. du Pont de Nemours and Company); POLYFOX PF-136A, PF-156A, and PF-151N (manufactured by OMNOVA SOLUTIONS INC.).

The surfactant is not limited to these. These can be used alone or in combination. Even when a single surfactant is not easily dissolved in the liquid material, a surfactant mixture can be easily dissolved and stably present therein.

To demonstrate permeation of a surfactant to polymers covered with a powder material for a 3D object, the proportion of the surfactant to the liquid material for manufacturing a glass object for curing is preferably 0.01-5 percent by mass. When the proportion of the surfactant in total is less than 0.01 percent by mass, wettability is not improved so that permeability to the polymer covered with the powder material is not improved. When the proportion of the surfactant is greater than 5.0 percent by mass, storage stability tends to deteriorate.

Other Components

In addition, in the present invention, the liquid material for curing may optionally include additives such as a defoaming agent, a preservatives and fungicides, a pH regulator, a chelating agent, and a corrosion inhibitor.

Defoaming Agent

As the deforaming agent, generally-used defoaming agent can be used.

These are, for example, silicone defoaming agents, polyether defoaming agents, and aliphatic acid ester defoaming agents. These can be used alone or in combination. Of these, a combinational use with a silicone-based defoaming agent is preferable in terms of foam-breaking.

Examples of the silicone defoaming agent are oil type silicone defoaming agent, compound type silicone defoaming agent, self-emulsification type silicone defoaming agent, emulsion type silicone defoaming agent, and modified silicone defoaming agent.

As the modified silicone defoaming agents, amino-modified silicone defoaming agents, carbinol-modified silicone defoaming agents, methacryl-modified silicone defoaming agents, polyether-modified silicone defoaming agents, alkyl-modified silicone defoaming agents, higher aliphatic acid ester-modified silicone defoaming agents, and alkyleneoxide-modified silicone defoaming agents.

Of these, taking into account usage to the liquid material as the aqueous medium, self-emulsification type silicone defoaming agents and emulsion type silicone defoaming agents are preferable.

Typical defoaming agents are also available on the market. Specific examples of the marketed products thereof include, but are not limited to, silicone defoaming agent (KS508, KS531, KM72, and KM85, manufactured by Shin-Etsu Chemical CO., LTD.), silicone defoaming agent (Q2-3183A, SH5510, etc., manufactured by DOW CORNING TORAY CO., LTD.), silicone defoaming agents (SAG30, etc., manufactured by NIPPON UNICAR COMPANY LIMITED), and defoaming agents (ADEKANATE series, manufactured by ADEKA CORPORATION).

The proportion of the defoaming agent in the liquid material has no particular limit. However, many of the defoaming agents are not completely dissolved in the liquid material and tend to be separated and precipitated so that it is better to keep addition of the defoaming agent as least as possible. However, if bubbles are formed during filling, filling property deteriorates. Therefore, the minimum amount can be contained. The proportion of the defoaming agent can be changed and is, for example, preferably 0-3 percent by mass to the liquid material for curing and more preferably 0 to 0.5 percent by mass.

It is possible to use in a combination with a typical defoaming agent and contain inorganic particulates to improve the bubble-breaking power. However, it is not preferable to use it as the defoaming agent for the liquid material.

Preservatives and Fungicides

Specific examples of the preservatives and fungicides include, but are not limited to, dehydrosodium acetate, sodium sorbinate, 2-pyridine thioll-oxide sodium, sodium benzoate, and pentachlorophenol sodium.

pH Regulator

Any material that can adjust pH to a desired value without an adverse impact on the liquid material to be prescribed can be the pH regulator.

Amines, alkali metal hydroxides, alkali metal hydroxides, quaternary compound hydroxides, and alkali metal carbonates are used to adjust to basic. Inorganic acids and organic acids are used to adjust to acidity. Specific examples of such pH regulators include, but are not limited to, amines such as diethanol amine and triethanol amine, hydroxides of alkali metal elements such as lithium hydroxide, sodium hydroxide, and potassium hydroxide; ammonium hydroxide, quaternary ammonium hydroxide, quaternary phosphonium hydroxide, and carbonates of alkali metals such as lithium carbonate, sodium carbonate, and potassium carbonate.

Also, inorganic acids such as hydrochloric acid, sulfuric acid, nitric acid, phosphoric acid, and boracic acid, salts formed with mono-valent weak cation such as ammonium sulfate and ammonium phosphate, and organic acids such as acetic acid, oxalic acid, lactic acid, salicylic acid, benzoic acid, glucuronic acid, ascorbic acid, arginine acid, cysteine, fumaric acid, maleic acid, maronic acid, lycine, malic acid, citric acid, glycine, gultamic acid, succinic acid, tartaric acid, phthalic acid, pyrrolidone caroboxylic acid, pyrone carboxylic acid, pyrrole carboxylic acid, furancarboxylic acid, pyridinecarboxylic acid, coumaric acid, thiophene carboxylic acid, nicotinic acid, carborane acid, and derivatives of these compounds are suitable.

The pH regulator is not limited to these compounds mentioned above.

A pH regulator having optimal temporary dissociation constant pKa suitable according to properties corresponding to pH change of the liquid material can be used alone or in combination. Buffering agents can be also used in combination.

These are available from various manufacturers including Tokyo Chemical Industry Co. Ltd.

Material Set for Manufacturing Glass Object

The material set for manufacturing a glass object of the present invention contains the powder material for manufacturing the glass object, the liquid material for manufacturing a glass object for curing, and other optional components.

Glass Object

The glass object to be obtained by the present invention is manufactured by the method of manufacturing a glass object of the present invention. The glass object obtained in the present invention is a cured object obtained by applying the liquid material to the powder material. The cured object is used as an article subject to sintering treatment to manufacture a sintered compact of the glass object. The cured object can also be obtained by applying the liquid material to the powder material using the material set for a glass object of the present invention.

The glass object obtained by simply applying the liquid material to the powder material demonstrates a sufficient strength. In the glass object, the glass powder is densely present and only a very minute amount of the first water soluble resin is present around the glass powder. Therefore, when a sintered object (sintered compact) is obtained by sintering after the glass object is manufactured, the volatile amount of organic components (removal of grease) is reduced unlike a typical cured object of powder or particles obtained by using an adhesive, etc. Unnecessary voids (marks of removed grease), etc. are not present in the sintered compact. As a consequence, the obtained object has an aesthetic appearance.

Since the glass object obtained by the present invention has good hardness, losing shape does not occur even when the glass object is subject to air blow treatment to remove extra powder material while the glass object is being held by hands. Thereafter, sintering can be easily conducted. In the glass object, the glass powder is densely present (high filling ratio) and only a very minute amount of the first water soluble resin is present around the glass powder. Therefore, if a sintered compact is obtained after sintering, unnecessary voids are less so that the obtained object has an aesthetic appearance.

It is preferable that the strength of the glass object be such that no losing shape, etc. occurs by abrading the surface thereof. Specifically, no cracking occurs when the object is subject to air blow treatment using an air gun having a nozzle diameter of 2 mm and an air pressure of 0.3 MPa at a point 5 cm away from the glass object.

Method of Manufacturing Glass Object and Device for Manufacturing Glass Object

The method of manufacturing a glass object of the present invention includes a process A (also referred to as a process of preparing a powder material for manufacturing a glass object) of covering glass powder with the first water soluble resin to prepare the powder material for manufacturing the glass object, a process B (also referred to as a process of supplying the powder material for manufacturing the glass object) of supplying the powder material, a process C (also referred to as a process of applying the liquid material) of applying the liquid material to the powder material, and a process of repeating the process B and the process C. By this repetition, a complex glass object is easily and efficiently manufactured with a good dimension accuracy without causing losing shape before sintering. The method of manufacturing a glass object of the present invention includes other optional processes such as sintering.

The device for manufacturing a glass object of the present invention includes a supplying device (a device for supplying a powder material for manufacturing a glass object) to supply a powder material for manufacturing a glass object including glass powder covered with a first water soluble resin, an applying device (device for applying a liquid material for manufacturing a glass object for curing) to apply a liquid material for manufacturing a glass object for curing to the powder material; a powder material accommodating unit to accommodate the powder material; and a liquid material accommodating unit to accommodate the liquid material. The device for manufacturing a glass object may further optionally include devices such as a supplying device to supply the liquid material, a sintering device, and liquid circulating device.

Process of Preparing Powder Material for Manufacturing Glass Object

The process of preparing the powder material for manufacturing a glass object includes covering the glass powder with the first water soluble resin to prepare the powder material for manufacturing a glass object. Flame retardant promoters, etc. may furthermore optionally be admixed.

Process and Device of Supplying Powder Material for Manufacturing Glass Object

The process of supplying a powder material for manufacturing a glass object includes supplying the powder material containing the glass powder covered with the first water soluble resin.

The supplying device for supplying the glass powder material supplies the powder material containing the glass powder covered with the first water soluble resin.

It is preferable to form a layer of the powder material for manufacturing a glass object on a substrate.

Substrate

The substrate is not particularly limited as long as it can place the powder material for manufacturing a glass object thereon and can be selected to suit to a particular application. Examples thereof are a known platform or base plate having a surface for the powder material illustrated in FIG. 1 of Japanese Unexamined Patent Application Publication No. 2000-328106.

The surface of the substrate, that is, the surface on which the powder material for manufacturing a glass object is placed can be smooth, coarse, plane, or curved plane. It is preferable that when the first water soluble resin in the powder material for manufacturing a glass object be dissolved and cross-linked due to a cross-linking agent, the surface and the first water soluble resin have low affinity. If the affinity of the surface with the dissolved and cross-linked first water soluble resin is lower than that of the glass powder with the dissolved and cross-linked first water soluble resin, it is easy to take the obtained 3D object out of the surface.

Forming Powder Material Layer for Manufacturing Glass Object

The method of placing the powder material for manufacturing a glass object on the substrate has no particular limit and can be selected to suit to a particular application. For example, as methods of forming a thin layer on the substrate, there are a method of using a selective laser sintering method disclosed in Japanese Patent No. 3607300, a method of using a known counter rotating mechanism (counter roller), etc., a method of expanding the powder material to a thin layer using a member such as a brush, a roller, and a blade, a method of expanding the powder material to a thin layer with a pressure on the surface of the powder material using a pressing member, and a method using a known powder laminator.

Using the counter rotation mechanism (counter roller), the brush, the blade, or the pressing member mentioned above, a thin layer of the powder material for manufacturing a glass object can be formed on a substrate, for example, in the following manner:

In an outer frame (also referred to as "form", "hollow cylinder", "tubular structure", etc.), the powder material for manufacturing a glass object is placed onto the substrate arranged to move up and down slidably along the inside wall of the outer frame by the counter rotation mechanism (counter roller), the brush, the blade, the pressing member, etc. To use a substrate movable up and down in the outer frame, it is disposed slightly lower than the upper opening of the outer frame. That is, while placing the substrate below the opening with a layer thickness of the powder material for manufacturing a glass object, the powder material is placed on the substrate. A thin layer of the powder material for manufacturing a glass object is thus-placed on the substrate.

By causing the liquid material to react with the powder material placed in a thin layer, the thin layer is cured (the process of curing the powder material layer described above).

Similarly, the powder material for manufacturing a glass object is placed thinly on the thin layer of the thus-obtained cured material and thereafter the liquid material for manufacturing a glass object is applied to the newly-formed thin layer to cure the newly-formed thin layer. This curing occurs not only to the powder material layer formed on the thin layer but also to the border between the cured layer and the thin layer (cured object) that is previously cured and present therebelow. As a consequence, the cured object (three-dimensional object) is obtained having a thickness corresponding to about the two layers of the powder material (layer) placed on the previously-formed thin layer.

In addition, it is possible to automatically and simply place a thin layer of the powder material for manufacturing a glass object on the substrate by using the known powder laminating device mentioned above. A typical powder laminating device has a recoater to laminate the powder material for manufacturing a glass object, a movable supplying tank to supply the powder material onto the substrate, and a movable forming tank to place the powder material to laminate thin layers. In the powder laminating device, the surface of the supplying tank can be elevated slightly above the surface of the forming tank by moving up the supplying tank, moving down the forming tank, or both. In addition, the powder material for manufacturing a glass object is arranged to form a thin layer from the supplying tank using the recoater. By repeating moving the recoater, the powder material for manufacturing a glass object of the thin layer is laminated.

The thickness of the powder material (layer) for manufacturing a glass object is not particularly limited and can be determined to suit to a particular application. For example, the average thickness for a single layer is preferably from 1-500 μm and more preferably from 10-200 μm.

When the thickness is 1 μm or greater, the strength of the cured object (3D object) of the powder material (layer) for manufacturing a glass object formed by applying the liquid material for curing to the powder material is sufficient, which makes it free of problems such as losing shape during processing such as sintering conducted after the layer is formed. When the thickness is 500 μm or below, the dimension accuracy of the cured object (3D object) of the powder material (layer) for manufacturing a glass object formed by applying the liquid material for curing to the powder material for manufacturing a glass object.

Incidentally, the average thickness has no particular limitation and can be measured according to a known method.

Process and Device for Applying Liquid Material for Manufacturing Glass Object for Curing In the process of applying the liquid material for manufacturing a glass object for curing, the liquid material is applied to the powder material for manufacturing a glass object.

The device for applying the liquid material for manufacturing a glass object for curing applies the liquid material to the powder material.

When the liquid material for manufacturing a glass object for curing is applied, predetermined areas of the powder material for manufacturing a glass object is cured.

The method of applying the liquid material for manufacturing a glass object for curing has no particularly limitation and can be suitably determined to suit to a particular application. For example, a dispenser method, a spray method, or an inkjet method is suitable. To execute such a method, a known device is suitably used as the solution applying device.

Of these, the dispenser method has an excellent quantitative property but the application area is small. The spray method is capable of simply forming a fine discharging material, has a wide application area, and demonstrates excellent applicability but the quantitative property thereof is poor so that powder scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable in order to accurately and efficiently form a complex shape.

When utilizing the inkjet method, the device for applying the liquid material for manufacturing a glass object for curing has a nozzle to apply the liquid material for manufacturing a glass object for curing to the glass powder material layer by the inkjet method. As the nozzle, nozzles (discharging head) in known inkjet printers can be suitably used. In addition, it is possible to use an inkjet printer as the device for applying the liquid material for manufacturing a glass object for curing. A preferred specific example of the inkjet printer is, for example, SG7100, manufactured by Ricoh Company Ltd. It is preferable to use an inkjet printer because the head portion thereof can drip a large amount of the liquid material for curing at once and the application area is large. This leads to improvement of high application performance.

In the present invention, even if an inkjet printer capable of imparting the liquid material for curing with accuracy and high efficiency is used, clogging, corrosion, etc. of nozzles and heads are suppressed because the liquid material for curing contains no solid matters such as particles or highly viscous polymers such as resins. In addition, when the liquid material is applied (discharged) to the powder material for manufacturing a glass object, the liquid material efficiently permeates into the first water soluble resin in the powder material for manufacturing a glass object, which leads to good manufacturing efficiency of a 3D object. Furthermore, the content of a polymer component such as a resin to be applied is extremely small. Therefore, no unexpected volume increase occurs and a cured object with a good dimension accuracy is easily and efficiently obtained in a short time.

The cross-linking agent can also serve as a pH regulator in the liquid material for manufacturing a glass object for curing.

With regard to the pH of the liquid material for curing, when the liquid material is applied to the powder material for manufacturing a glass object, the pH is preferably 5 (weak acidity)—12 (basic) and more preferably 8-10 (weak basic) in terms of prevention of clogging and corrosion of nozzle head portions of nozzles to be used. To regulate the pH, known pH regulators may be used.

Addition Method of Sintering Helping Agent

For example, the addition method of a sintering helping agent is as follows.

1. A sintering helping agent is dispersed in first water soluble resin coating liquid, which covers glass powder (glass particle)
2. Particles of sintering helping agent are mixed with glass powder (glass particle) coated with the first water soluble resin
3. A sintering helping agent is dispersed in the liquid material for manufacturing a glass object for curing and added to the powder material for manufacturing a glass object when forming an object.

The present inventors have investigated all the methods. Of these, the method 1 is found to be unsuitable to demonstrate the requisites mentioned above. The present inventors deduce that the sintering helping agent fixed in the water soluble resin is in a state in which the sintering helping agent is difficult to demonstrate the feature. Therefore, the conclusion is that the method 1 is not applicable because the glass particle is deformed, which extremely degrades fluidity of the powder material so that it is not easy to form a uniform powder layer.

The method 2 is extremely simple and easy but easily causes non-uniformity in an obtained object. Therefore, the present inventors concluded that the method 2 was not applicable at first. However, as a result of the investigation made by the present inventors, the present inventors have confirmed that the average particle diameter of a sintering helping agent is preferably in the range of from about 1/5-about 1/2 to the average secondary particle diameter of the glass particle to demonstrate the effect. The proportion of the sintering helping agent to be added is preferably 5 percent by mass or less and more preferably 1 percent by mass or less.

The method 3 is effective. However, it is found that when a sintering helping agent is dispersed in the liquid material for manufacturing a glass object for curing, the sintering helping agent settles and agglomerates in the liquid material for curing depending on the specific weight thereof. However, with regard to settling, the particle of the sintering helping agent is preferably smaller. However, the volume average particle diameter of the sintering helping agent is preferably in the range of from about 1/50 to about 1/2 to the average secondary particle diameter of the glass particle to demonstrate the effect. The proportion of the sintering helping agent to be added is preferably 10 percent by mass or less and more preferably 5 percent by mass or less to the powder material for manufacturing a glass object. Furthermore, if a liquid material for curing having such an agglomeration property, it is preferable to use an inkjet head having a liquid circulating mechanism to prevent agglomeration.

The average particle diameter is volume average particle diameter.

Powder Material Accommodating Unit

The powder material accommodating unit contains the powder material for manufacturing a glass object. The size, forms, materials, etc. thereof are not particularly limited and can be determined to suit to a particular application. For example, a storage tank, a bag, a cartridge, or a tank is suitable.

Liquid Material Accommodating Unit

The liquid material (for curing) accommodating unit accommodates the liquid material for curing. The size, forms, materials, etc. thereof are not particularly limited and can be determined to suit to a particular application. For example, a storage tank, a bag, a cartridge, or a tank is suitable.

Other Process and Other Device

The other processes include a drying process, a sintering process, a surface protection treatment process, a coating (application) process, etc.

The other devices include a dryer, a sintering device, a surface protection treatment device, a coating device (applicator), a liquid material (for curing) supplying device, etc.

In the drying process, a cured material (3D object) obtained in the process of curing the glass powder material is dried. In the drying process, not only water contained in the cured object but also organic materials may be removed (degreasing). For example, known driers can be used as the drying device.

In the sintering process, a cured material (3D object) formed in the process of curing the glass powder material. According to this sintering process, the cured material is made as an integrated object (sintered compact of the 3D object) of metal or ceramic. For example, a known sintering furnace can be used as the sintering device.

In the surface protection treatment, a protection layer is formed on a cured material (3D object) formed in the process of applying the liquid material for manufacturing a glass object for curing. Due to the surface protection treatment, the surface of the cured material (3D object) has durability to a degree that, for example, the object can be used as is. Specific examples of the protection layer include, but are not limited to, a water-resistant layer, a weather resistant layer, a light resistant layer, a heat insulation layer, and a gloss layer.

Specific examples of the surface protection treatment device include, but are not limited to, known surface protection treatment devices such as a spraying device and a coating device.

In the coating step, coating for a cured material (3D object) formed in the step of curing the glass powder material layer. By the coating process, the cured object (3D modeling) is colored in a desired color. Specific examples of the coating device include, but are not limited to, known coating devices using a spray, a roller, a brush.

FIG. 1 is a diagram illustrating an example of the device for manufacturing a glass object of the present invention. The device for manufacturing a glass object illustrated in FIG. 1 includes a powder material storage tank 1 for forming a glass object and a powder material storage tank 2 for supplying the powder material. Each of these powder material storage tanks has a stage 3 movable up and down and places the powder material for forming a 3D object on the stage 3.

The device for manufacturing a glass object includes an inkjet head 5 over the powder material storage tank 1 to discharge a liquid material 4 for curing toward the powder material for manufacturing a glass object in the powder material storage tank 1. Moreover, it supplies the powder material for manufacturing a glass object from the powder storage tank 2 to the powder storage tank 1. It also has a recoating mechanism (hereinafter referred to as recoater) 6 to smooth the surface of the powder material for manufacturing a glass object in the powder storage tank 1.

The liquid material 4 is dripped from the inkjet head 5 onto the powder material in the powder storage tank 1. The position where the liquid material 4 is dripped is determined by two-dimensional image data (slice data) obtained by slicing a desired 3D shape into multiple plane layers.

After completing depiction corresponding to an amount of a single layer, the stage 3 for the powder material storage tank 2 is elevated while the stage 3 for the storage tank 1 is lowered. The amount of the powder material for manufacturing a glass object corresponding to the difference is moved to the powder material storage tank 1 by the recoater 6.

This is how a new layer of the powder material for manufacturing a glass object is formed on the surface of the previously depicted powder material. The thickness of the single layer of the powder material is about several tens—about several hundreds μm.

Furthermore, depiction is conducted on the newly-formed powder material layer based on the slice data for the second layer. A series of these processes are repeated to obtain a glass object. Subsequent to heating and drying by a heater, a final object is obtained.

Figure 2:
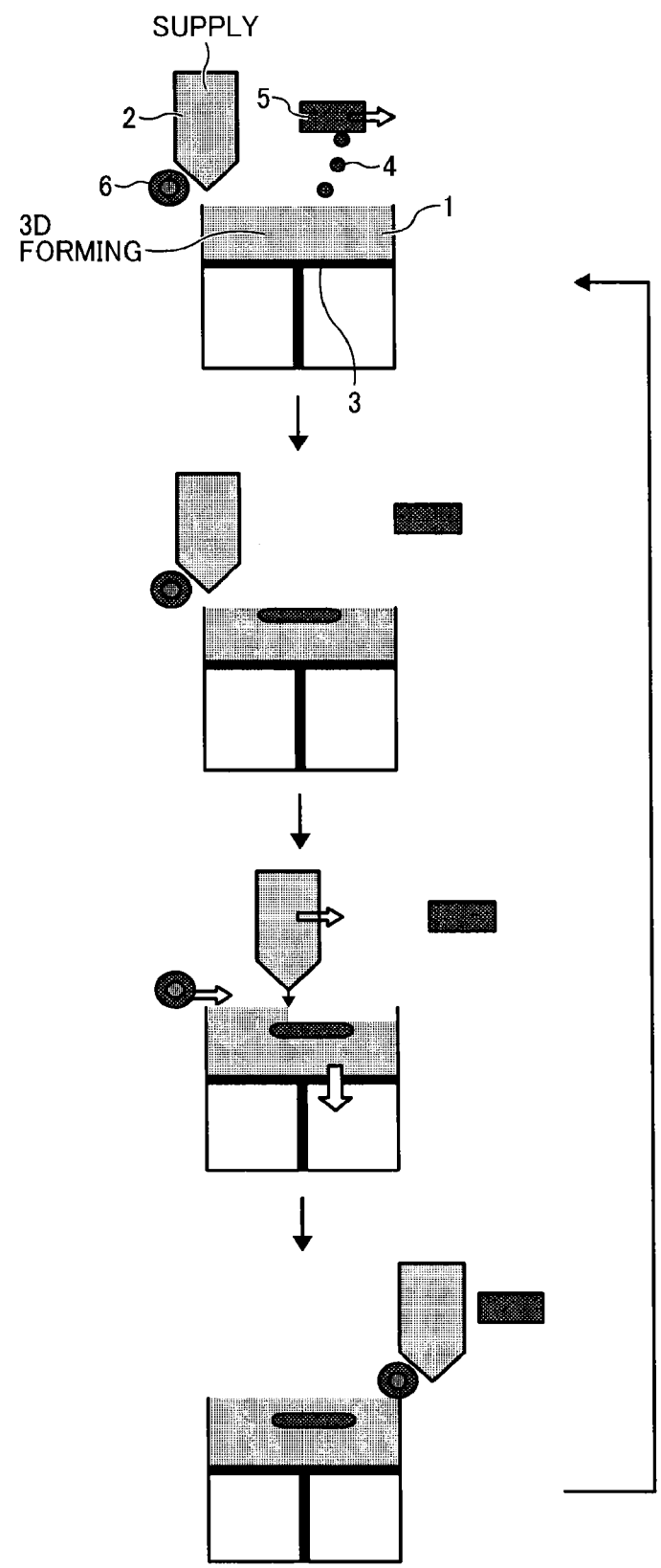
FIG. 2 is a schematic diagram illustrating another example of the device for manufacturing a glass object according to an embodiment of the present invention.

FIG. 2 is a diagram illustrating another example of the device for manufacturing a glass object of the present invention. The device illustrated in FIG. 2 is operated on the same principle as that illustrated in FIG. 1. However both have different supplying mechanisms for powder materials. That is, the powder storage tank 2 is disposed over the powder storage tank 1. When the depiction of the first layer is finished, the stage 3 of the powder storage tank 1 is lowered in a predetermined amount and the powder material is dropped from the powder storage tank 2 to the powder storage tank 1 while moving the powder storage tank 2 to form a new powder material layer. Thereafter, the recoater 6 compresses the powder material to increase the bulk density and also smooth the height of the powder material layer for a 3D object.

By the powder material layer forming device illustrated in FIG. 2, the configuration of the device is compact in comparison with the configuration illustrated in FIG. 1 in which the two powder storage tanks are arranged side by side.

According to the present invention, a complicated 3D object can be simply and efficiently manufactured with good dimension accuracy without losing shape before sintering, etc.

Since the thus-obtained 3D object and the sintered compact thereof have sufficient strength and excellent dimension accuracy representing fine roughness and curved planes, the object and the sintered compact have aesthetic aspect with high quality and can be suitably used for various purposes.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described in detail with reference to the Examples but not limited to the following Examples.

Example 1

Preparation of Powder Material 1 for Manufacturing Glass Object

Preparation of Coating Liquid 1

114 parts of water was mixed with 6 parts of acetoacetyl group modified polyvinyl alcohol (Gohsenx™ Z-100, average polymerization degree: 500, saponification degree: 98.5 mol percent, manufactured by The Nippon Synthetic Chemical Industry Co., Ltd.) as the first water soluble resin. Thereafter, while keeping the mixture at 90 degrees C. in a water bath by heating, the mixture was stirred for one hour by a three one motor (BL600, manufactured by SHINTO Scientific Co., Ltd.) to dissolve the acetoacetyl group modified polyvinyl alcohol in water. 120 parts of an aqueous solution of 5 percent by mass acetoacetyl group modified polyvinyl alcohol was thus prepared. The obtained preparation liquid was determined as [Coating liquid 1].

The viscosity of the aqueous solution of 4 percent by mass (w/w percent) acetoacetyl group modified polyvinyl alcohol at 20 degrees C. was 5.0 - 6.0 mPa·s. The viscometer used was DV-E VISCOMETER HADVE 115 TYPE (manufactured by Brookfield Engineering).

Coating of Coating Liquid 1

Fine glass powder (EMB-10, volume average particle diameter: 5 μm, manufactured by Potters-Ballotini Co., Ltd.) was pulverized and dispersed in a vibration mill (small vibration mill, manufactured by CHUO KAKOHKI CO., LTD.) for 24 hours. Thereafter, only ultra fine powder having a diameter of 3 μm or less was extracted by a jet classifier (EJ-L-3, manufactured by MATSUBO Corporation). The volume average particle diameter thereof was 1 μm as measured by using a particle diameter measuring device (Microtrac HRA, manufactured by NIKKISO CO., LTD.) available on the market. 100 parts of the ultra fine powder glass was covered with [Coating liquid 1] using a coating device (ADL311S-A, manufactured by Yamato Scientific Co., Ltd.) available on the market. Sampling was arbitrarily made in the middle of coating to control the time and interval of the coating in order to achieve a coverage thickness (average thickness) of 80 nm or more and a coverage factor (percent) of 100 percent. As a result, [Powder material 1 for manufacturing a glass object] was obtained. The conditions of the coverage thickness and the measuring method of the surface coverage factor, and the coating conditions are shown below.

Coverage Thickness

A sample for observation for coverage thickness (average thickness) was prepared by polishing the surface of [Powder material 1 for manufacturing a glass object] by emery paper and thereafter slightly polishing the surface with a wet cloth to dissolve the water soluble resin portion. Next, the border portion between the glass powder and the first water soluble resin exposed to the surface was observed by a field-emission-type scanning electron microscope (FE-SEM) and the border portion was measured as the coverage thickness.

Thereafter, the average of ten measured points was calculated and determined as the coverage thickness (average thickness).

Surface Coverage Factor

Using a field-emission-type scanning electron microscope (FE-SEM), an Energy Selective Backscatter (ESB) image was taken under the following conditions with a field of vision in which the number of [Powder material 1 for manufacturing a glass object] was around ten in the image followed by image processing for digitization using Image J software. The coverage portion was black while the base material was white. The rate of {black portion area/(black portion area+white portion area)} in a particle×100 was obtained. 10 particles were measured and the average of the 10 particles was determined as the surface coverage factor (percent).

SEM Observation Condition
Signal: Energy Selective Backscatter (ESB)
EHT: 0.80 kV
ESB Grid: 700 V
WD: 3.0 mm
Aperture Size: 30.00 μm
Contrast: 80 percent
Magnification: set for each sample in order to have around 10 particles in the horizontal direction of screen Coating Conditions
Spray setting
Nozzle type: 970
Nozzle diameter: 1.2 mm
Coating liquid discharging pressure: 4.7 Pa·s
Coating liquid discharging speed: 3 g/min.
Atomized air amount: 50 NL/min
Rotor setting
Rotor type: M-1
Rotation speed: 60 rpm
Number of rotation: 400 percent
Air stream setting
Air supply temperature: 80 degrees C.
Air supply amount: 0.8 $m^3$/ min.
Bug filter shaking pressure: 0.2 MPa
Bug filter shaking time: 0.3 seconds
Bug filter interval: 5 seconds
Coating time: 40 minutes For the obtained [Powder material 1 for manufacturing a glass object], the average particle diameter was measured by using a particle diameter measuring device (Microtrac HRA, manufactured by NIKKISO CO., LTD.) available on the market. It was 3 μm. In addition, the repose angle was measured by a repose angle measuring device (Powder tester PT-N type, manufactured by Hosokawa Micron Corporation) to represent the fluidity of [Powder material 1 for manufacturing a glass object]. The angle was 35 degrees. As the measuring value of the repose angle increases, fluidity tends to be inferior.

Preparation of Liquid Material for Manufacturing Glass Object for Curing 70 parts of water, 40 parts of a hydrophilic organic solvent, 5 parts of a cross-linking agent, 0.5 parts of a stabilizer, and 15.0 parts of polyvinyl pyrrolidone (K-15, weight average molecular weight: 7,601, manufactured by Nippon Shokubai Co., Ltd.) as the second water soluble resin were dispersed for 30 minutes by a HOMOMIXER to prepare [Liquid material 1 for manufacturing a glass object for curing].

Propylene glycol (manufactured by Tokyo Chemical Industry Co. Ltd.) was used as the hydrophilic organic solvent. Ammonium salt of zirconium carbonate (Zircosol AC-20, manufactured by DAIICHI KIGENSO KAGAKU KOGYO CO., LTD.) was used as the cross-linking agent. 2-amino-2-ethyl-1,3-propane diol (manufactured by Tokyo Chemical Industry Co. Ltd.) was used as the stabilizer.

The viscosity of [Liquid material 1 for manufacturing a glass object for curing] at 25 degrees C. was 21 mPa·s as measured by a viscometer (DV-E VISCOMETER HADVE 115 TYPE, manufactured by Brookfield Engineering). In addition, the viscosity change rate before and after the liquid material was left undone at 50 degrees C. for three days was 18 percent.

Method of Manufacturing Glass Object

1. Using a known device for manufacturing (forming) a 3D object as illustrated in FIG. 1, [Powder material 1 for manufacturing a glass object] was transferred from the powder material storage tank for supplying to the object manufacturing tank to form a layer having an average thickness of 100 μm on the substrate.

2. Next, [Liquid material 1 for manufacturing a glass object for curing] was applied (discharged) to the surface of [Powder material 1 for manufacturing a glass object] from nozzles of a known inkjet discharging head. As a result, the polyvinyl alcohol was dissolved in water contained in [Liquid material 1 for manufacturing a glass object for curing] so that the acetoacetyl group modified polyvinyl alcohol was cross-linked due to the cross-linking agent (Zircosol AC-20) contained in [Liquid material 1 for manufacturing a glass object for curing].

3. Next, the operations 1 and 2 were repeated until the thickness reached a predetermined average thickness of 3 mm. Thereafter, of the supplied [Powder material 1 for manufacturing a glass object], the portion cured by [Liquid material 1 for manufacturing a glass object for curing] was taken out. Thereafter, the 3D object was dried at 80 degrees C. for four hours using a drier and thereafter maintained at 120 degrees C. for 12 hours to obtain [3D object 1].

Losing shape did not occur to the thus-obtained [3D object 1] when extra [Powder material 1 for manufacturing a glass object] was removed by air blow, meaning that the object had excellent strength and dimension accuracy.

4. The sintering conditions were determined with reference to a report (Yoshida, et al, "Resource and Material", Vol. 120, p 451 to 454, published in 2004).

[3D object 1] obtained in the step 3 described above was heated in a sintering furnace to 600 degrees C. in 6 hours in a nitrogen atmosphere. Subsequent to reducing the pressure, the temperature was maintained at 600 degrees C. for four hours at 1 Pa or less. Thereafter, [3D object 1] was cooled down to room temperature in four hours for degreasing. Thereafter, [3D object 1] was subject to sintering treatment at 1 Pa or less at 800 degrees C. in the sintering furnace for six hours. As a result, the obtained [Glass object 1] had an aesthetic surface with transparency.

Evaluation

[Glass object 1] was evaluated with regard to the following. The dimension of the sample was 12 mm (width)×70 mm (length)×1 mm (thickness). The results are shown in Tables 1 and 2.

Coloring and Transparency

Coloring was visually checked for the sample. Thereafter, the transparency of the sample was measured by a spectrophotometer (U-6000 type, manufactured by Hitachi High-Technologies Corporation).

Dimension Accuracy

The sample was visually checked and classified according to the following criteria.
A: Obtained 3D object had smooth and aesthetic surface with no warp
B: Obtained 3D object had good surface conditions but with slight warp
C: Surface of obtained 3D object was distorted. Glass powder and the first water soluble resin were locally present.

Tensile Strength

Tensile strength of the sample was measured by using an autograph (AG-1 type, manufactured by Shimadzu Corporation) and classified according to the following criteria.
A: Strength at breakage was 10 MPa/cm$^2$ or greater
B: Strength at breakage was 1—<10 MPa/cm$^2$
C: Strength at breakage was less than 1 MPa/cm$^2$ Example 2

[Liquid material 2 for manufacturing a glass object for curing] was prepared in the same manner as in Example 1 except that polyvinyl pyrrolidone was changed from K-15 to 4.8 parts of K-30 (mass average molecular weight: 48,262, manufactured by Nippon Shokubai Co., Ltd.) and 40 parts of propylene glycol serving as the hydrophilic organic solvent was changed to 18 parts. [Glass object 2] was manufactured and evaluated in the same manner as in Example 1 except that [Liquid material 2 for manufacturing a glass object for curing] was used instead of [Liquid material 1 for manufacturing a glass object for curing]. The results are shown in Tables 1 and 2.

The viscosity of [Liquid material 2 for manufacturing a glass object for curing] was 8 mPa·s at 25 degrees C. In addition, the viscosity change rate before and after [Liquid material 2 for manufacturing a glass object for curing] was left undone at 50 degrees C. for three days was 7 percent.

Example 3

In the preparation of powder material for manufacturing a glass object of Example 2, fine glass powder (Glass bead UBS-0010E, volume average particle diameter: 10 μm, manufactured by UNITIKA LTD.) was used as the glass powder and pulverized and dispersed by the vibration mill (small vibration mill, manufactured by CHUO KAKOHKI CO., LTD.) for 12 hours. Thereafter, only ultra fine powder having a diameter of 5 μm or less was extracted by a jet classifier (EJ-L-3, manufactured by MATSUBO Corporation). The volume average particle diameter thereof was 3.1 μm as measured by using a particle diameter measuring device (Microtrac HRA, manufactured by NIKKISO CO., LTD.) available on the market. This ultra fine glass powder was determined as [Powder material 3 for manufacturing a glass object]. [Glass object 3] was manufactured and evaluated in the same manner as in Example 1 except that [Powder material 3 for manufacturing a glass object] and [Liquid material 2 for manufacturing a glass object for curing] were used instead. The results are shown in Tables 1 and 2.

Example 4

[Liquid material 4 for manufacturing a glass object for curing] was prepared in the same manner as in Example 1 except that 15 parts of polyvinyl pyrrolidone (K-15, mass average molecular weight: 7,601, manufactured by Nippon Shokubai Co., Ltd.) to 4.0 parts and 40 parts of propylene glycol serving as the hydrophilic organic solvent was changed to 22 parts. [Glass object 4] was manufactured and evaluated in the same manner as in Example 1 except that [Liquid material 4 for manufacturing a glass object for curing] was used instead of [Liquid material 1 for manufacturing a glass object for curing]. The results are shown in Tables 1 and 2.

The viscosity of [Liquid material 4 for manufacturing a glass object for curing] was 6.8 mPa·s at 25 degrees C. In addition, the viscosity change rate before and after [Liquid material 4 for manufacturing a glass object for curing] was left undone at 50 degrees C. for three days was 6 percent.

Example 5

In the preparation of liquid material for manufacturing a glass object for curing of Example 1, 2 parts of pigments for pottery series N-10 (manufactured by NITTO GANRYO KOGYO CO., LTD.) was added as a coloring component to prepare [Liquid material 5 for manufacturing a glass object for curing]. [Glass object 5] was manufactured and evaluated in the same manner as in Example 1 except that [Liquid material 5 for manufacturing a glass object for curing] was used instead of [Liquid material 1 for manufacturing a glass object for curing]. The results are shown in Tables 1 and 2.

The viscosity of [Liquid material 5 for manufacturing a glass object for curing] was 7.8 mPa·s at 25 degrees C. In addition, the viscosity change rate before and after the liquid material was left undone at 50 degrees C. for three days was 18 percent.

Example 6

In the preparation of liquid material for manufacturing a glass object for curing of Example 1, 2 parts of pigments for pottery series M-240 (manufactured by NITTO GANRYO KOGYO CO., LTD.) was added as a coloring component to prepare [Liquid material 6 for manufacturing a glass object for curing]. [Glass object 6] was manufactured and evaluated in the same manner as in Example 1 except that [Liquid material 6 for manufacturing a glass object for curing] was used instead of [Liquid material 1 for manufacturing a glass object for curing]. The results are shown in Tables 1 and 2.

The viscosity of [Liquid material 6 for manufacturing a glass object for curing] was 7.0 mPa·s at 25 degrees C. In addition, the viscosity change rate before and after the liquid material was left undone at 50 degrees C. for three days was 18 percent.

Comparative Example 1

[Powder material 7 for manufacturing a glass object] was obtained in the same manner as in Example 1 except that polyvinyl alcohol having no modifying group was used as the first water soluble resin. Also, [Liquid material 7 for manufacturing a glass object for curing] was prepared in the same manner as in Example 1 except that polyvinyl pyrrolidone was changed from K-15 to 0.5 parts of K-85 (mass average molecular weight: 1,330,703, manufactured by Nippon Shokubai Co., Ltd.) and no cross-linking agent was used.

The viscosity of [Liquid material 7 for manufacturing a glass object] was 7.0 mPa·s at 25 degrees C. [Liquid material 7 for manufacturing a glass object] was tried to be discharged by the inkjet printer but it was confirmed that no droplet was discharged. No evaluation was possible. In this Comparative Example, it was not possible to manufacture a glass object. In addition, the viscosity change rate before and after [Liquid material 7 for manufacturing a glass object for curing] was left undone at 50 degrees C. for three days was 1 percent.

Comparative Example 2

[Liquid material 8 for manufacturing a glass object for curing] was prepared in the same manner as in Example 1 except that polyvinyl pyrrolidone was changed from K-15 to 0.8 parts of K-60 (mass average molecular weight: 115,172, manufactured by Nippon Shokubai Co., Ltd.). [Glass object 8] was manufactured and evaluated in the same manner as in Example 1 except that [Liquid material 8 for manufacturing a glass object for curing] was used instead of [Liquid material 1 for manufacturing a glass object for curing]. The results are shown in Tables 1 and 2.

The viscosity of [Liquid material 8 for manufacturing a glass object for curing] was 6.2 mPa·s at 25 degrees C. In addition, the viscosity change rate before and after [Liquid material 8 for manufacturing a glass object for curing] was left undone at 50 degrees C. for three days was 5 percent.

Comparative Example 3

[Liquid material 9 for manufacturing a glass object for curing] was prepared in the same manner as in Comparative Example 1 except that 5 parts of the cross-linking was used. [Glass object 9] was manufactured and evaluated in the same manner as in Comparative Example 1 except that [Liquid material 9 for manufacturing a glass object for curing] was used instead of [Liquid material 1 for manufacturing a glass object for curing]. The results are shown in Tables 1 and 2.

The viscosity of [Liquid material 9 for manufacturing a glass object for curing] was 7.3 mPa·s at 25 degrees C. In addition, the viscosity change rate before and after [Liquid material 9 for manufacturing a glass object for curing] was left undone at 50 degrees C. for three days was 1 percent.

Example 7

[Powder material 1 for manufacturing a glass object] (i.e., the material covered with [coating liquid 1]) as mixed with 1 part of aluminum nitride (AlN, manufactured by Tokuyama Corporation) and stirred and mixed in a ball mill for one hour. [Glass object 10] was manufactured and evaluated in the same manner as in Example 1. The results are shown in Tables 1 and 2.

Example 8

[Glass object 11] was manufactured and evaluated in the same manner as in Example 3 except that 0.5 parts of glass flit, manufactured by CENTRAL GLASS CO., LTD.) was added and dispersed in Preparation of Liquid Material for Manufacturing Glass Object for Curing to prepare a liquid material for curing and an inkjet head having a liquid circulating feature was used.

The results are shown in Tables 1 and 2.

TABLE 1

| | Powder material for manufacturing glass object | | | |
|---|---|---|---|---|
| | Glass powder | | First Water Soluble Resin | |
| | Name | Particle diameter (μm) after pulverization | Name | Content (parts by mass) |
| Example 1 | EBM-10 | 1.0 | Acetoacetyl group modified polyvinyl alcohol | 6 |
| Example 2 | EBM-10 | 1.0 | Acetoacetyl group modified polyvinyl alcohol | 6 |
| Example 3 | UBS-0010E | 3.1 | Acetoacetyl group modified polyvinyl alcohol | 6 |

TABLE 1-continued

| | | | | | |
|---|---|---|---|---|---|
| Example 4 | EBM-10 | 1.0 | Acetoacetyl group modified polyvinyl alcohol | 6 | |
| Example 5 | EBM-10 | 1.0 | Acetoacetyl group modified polyvinyl alcohol | 6 | |
| Example 6 | EBM-10 | 1.0 | Acetoacetyl group modified polyvinyl alcohol | 6 | |
| Comparative Example 1 | EBM-10 | 1.0 | Polyvinyl alcohol having no functional group | 6 | |
| Comparative Example 2 | EBM-10 | 1.0 | Acetoacetyl group modified polyvinyl alcohol | 6 | |
| Comparative Example 3 | EBM-10 | 1.0 | Polyvinyl alcohol having no functional group | 6 | |
| Example 7 | EBM-10 | 1.0 | Acetoacetyl group modified polyvinyl alcohol | 6 | |
| Example 8 | UBS-0010E | 3.1 | Acetoacetyl group modified polyvinyl alcohol | 6 | |

| | Liquid material for manufacturing glass object for curing | | | | | | | |
|---|---|---|---|---|---|---|---|---|
| | Second Water Soluble Resin | | | Hydrophilic organic solvent | | | Coloring material | |
| | Name | Content (parts by mass) | Proportion (% by mass) | Name | Content (parts by mass) | Proportion (% by mass) | Name | Content (parts by mass) |
| Example 1 | K-15 | 15 | 11.5 | Propylene glycol | 40 | 30.6 | — | — |
| Example 2 | K-30 | 4.8 | 4.8 | Propylene glycol | 18 | 18.3 | — | — |
| Example 3 | K-30 | 4.8 | 4.8 | Propylene glycol | 18 | 18.3 | — | — |
| Example 4 | K-15 | 4 | 4.0 | Propylene glycol | 22 | 21.7 | — | — |
| Example 5 | K-15 | 15 | 11.3 | Propylene glycol | 40 | 30.2 | N-10 | 2 |
| Example 6 | K-15 | 15 | 11.3 | Propylene glycol | 40 | 30.2 | M-240 | 2 |
| Comparative Example 1 | K-85 | 0.5 | 0.5 | Propylene glycol | 40 | 36.0 | — | — |
| Comparative Example 2 | K-60 | 0.8 | 0.7 | Propylene glycol | 40 | 34.4 | — | — |
| Comparative Example 3 | K-85 | 0.5 | 0.4 | Propylene glycol | 40 | 34.5 | — | — |
| Example 7 | K-15 | 15 | 11.5 | Propylene glycol | 40 | 30.6 | — | — |
| Example 8 | K-30 | 4.8 | 4.8 | Propylene glycol | 18 | 18.3 | — | — |

| | Liquid material for manufacturing glass object for curing | | | | | | |
|---|---|---|---|---|---|---|---|
| | Cross-linking Agent | | Sintering Helping Agent | | | Viscosity (mPa · s) of liquid material for curing | Viscosity change rate (%) |
| | Name | Content (parts by mass) | Kind | Average particle diameter | Method of Addition | | |
| Example 1 | Ammonium zirconium carbonate | 5 | | | | 21.0 | 18 |
| Example 2 | Ammonium zirconium carbonate | 5 | | | | 8.0 | 7 |
| Example 3 | Ammonium zirconium carbonate | 5 | | | | 8.0 | 7 |
| Example 4 | Ammonium zirconium carbonate | 5 | | | | 6.8 | 6 |
| Example 5 | Ammonium zirconium carbonate | 5 | | | | 7.8 | 18 |

TABLE 1-continued

| | | | | | | | |
|---|---|---|---|---|---|---|---|
| Example 6 | Ammonium zirconium carbonate | 5 | | | | 7.0 | 18 |
| Comparative Example 1 | — | — | | | | 7.0 | 1 |
| Comparative Example 2 | Ammonium zirconium carbonate | 5 | | | | 6.2 | 5 |
| Comparative Example 3 | Ammonium zirconium carbonate | 5 | | | | 7.3 | 1 |
| Example 7 | Ammonium zirconium carbonate | 5 | AlN (aluminum nitride) | 500 nm | Powder mixing | 21.0 | 15 |
| Example 8 | Ammonium zirconium carbonate | 5 | Glass flit | 400 nm | Liquid material dispersion | 8.1 | 10 |

TABLE 2

| | Evaluation | | | | | |
|---|---|---|---|---|---|---|
| | Visual observation | | Transparency (%) | | | Dimension | Tensile |
| | Coloring | Transparency | 350 nm | 400 nm | 600 nm | Accuracy | Strength |
| Example 1 | Non color | Transparent | 82 | 99 | 90 | B | B |
| Example 2 | Non color | Transparent | 90 | 99 | 92 | A | A |
| Example 3 | Non color | Transparent | 89 | 99 | 91 | A | A |
| Example 4 | Non color | Transparent | 90 | 98 | 99 | A | A |
| Example 5 | Blue | Non-transparent | 85 | 88 | 40 | A | B |
| Example 6 | Orange | Transparent | 80 | 30 | 99 | A | B |
| Comparative Example 1 | Unable to measure | Unable to measure | Unable to measure | Unable to measure | Unable to measure | Unable to measure | Unable to measure |
| Comparative Example 2 | Black | Non-transparent | 9 | 15 | 10 | C | C |
| Comparative Example 3 | Black | Non-transparent | 10 | 18 | 6 | C | C |
| Example 7 | Non color | Transparent | 90 | 100 | 98 | B | B |
| Example 8 | Non color | Transparent | 92 | 99 | 99 | A | A |

According to the present invention, a material set for manufacturing a glass object is provided to manufacture a glass object having excellent transparency, good dimension accuracy, and excellent strength.

Having now fully described embodiments of the present invention, it will be apparent to one of ordinary skill in the art that many changes and modifications can be made thereto without departing from the spirit and scope of embodiments of the invention as set forth herein.

What is claimed is:

1. A material set for manufacturing a glass object, the material set comprising:
   a powder material including glass and a first water soluble resin; and
   a liquid material including water and a second water soluble resin that includes polyvinyl pyrrolidone and has a mass average molecular weight of less than 50,000.

2. The material set according to claim 1, wherein the first water soluble resin and the second water soluble resin are different from each other.

3. The material set according to claim 1, wherein the second water soluble resin accounts for less than 5 percent by mass of the liquid material.

4. The material set according to claim 1, wherein the first water soluble resin includes a modified polyvinyl alcohol.

5. The material set according to claim 1, further comprising a cross-linking agent.

6. The material set according to claim 1, further comprising a hydrophilic organic solvent, the hydrophilic organic solvent accounting for less than 20 percent by mass of the liquid material.

7. The material set according to claim 1, wherein a viscosity of the liquid material at 25 degrees C is 20 mPa·s or less.

8. The material set according to claim 1, wherein a viscosity change rate of the material set between before and after the material set is left undone at 50 degrees C for three days is less than 20 percent by mass.

9. The material set according to claim 1, wherein a volume average primary particle diameter of the powder material is less than 3 μm.

10. The material set according to claim 1, further comprising a sintering helping agent in the powder material or the liquid material.

11. A liquid material for manufacturing a glass object for curing glass, the liquid material comprising:
- water; and
- a second water soluble resin that includes polyvinyl pyrrolidone and has a mass average molecular weight of less than 50,000.

12. A method of manufacturing a glass object, the method comprising:
- supplying a powder material including glass and a first water soluble resin;
- applying the liquid material of claim 11 to the powder material; and
- repeating the supplying and the applying.

13. A device for manufacturing a glass object, the device comprising:
- a supplying device to supply a powder material including glass and a first water soluble resin;
- an applying device to apply the liquid material of claim 11 to the powder material;
- a powder material accommodating unit to accommodate the powder material; and
- a liquid material accommodating unit to accommodate the liquid material.

* * * * *